US007552897B2

(12) United States Patent
Gaston

(10) Patent No.: US 7,552,897 B2
(45) Date of Patent: Jun. 30, 2009

(54) METHOD AND SYSTEM FOR ROTARY CODE-BASED CONTROL

(75) Inventor: Darrell W. Gaston, Everett, WA (US)

(73) Assignee: The Boeing Company, Chicago, IL (US)

( * ) Notice: Subject to any disclaimer, the term of this patent is extended or adjusted under 35 U.S.C. 154(b) by 580 days.

(21) Appl. No.: 11/181,513

(22) Filed: Jul. 14, 2005

(65) Prior Publication Data

US 2007/0013556 A1 Jan. 18, 2007

(51) Int. Cl.
*B64C 13/00* (2006.01)

(52) U.S. Cl. ..................... 244/221; 244/228; 338/32 H; 335/207; 324/207.2

(58) Field of Classification Search ................. 244/227, 244/228, 229, 230, 234, 236, 221, 222; 338/32 H, 338/32 R; 335/207, 206, 205; 324/207.2
See application file for complete search history.

(56) References Cited

U.S. PATENT DOCUMENTS 3,331,972 A * 7/1967 Moller ........................ 310/10
4,054,860 A * 10/1977 Henderson et al. ......... 338/32 H
4,415,856 A * 11/1983 Welles .................... 324/207.25
5,861,796 A * 1/1999 Benshoff .................. 338/32 H
5,872,528 A * 2/1999 Gaultier et al. ............... 341/35
5,999,108 A 12/1999 Hanneman .................. 340/945
6,587,056 B1 7/2003 Fraser et al. ................ 340/945
6,612,404 B2 * 9/2003 Sweet et al. ................ 187/395
6,854,566 B2 * 2/2005 Sweet et al. ................ 187/395
7,009,387 B2 * 3/2006 Guderzo .................. 324/207.2
7,126,072 B2 * 10/2006 Saitoh ........................ 200/512
2004/0206615 A1 * 10/2004 Aisenbrey ................... 200/262
2007/0023272 A1 * 2/2007 Aisenbrey ................... 200/341

* cited by examiner

*Primary Examiner*—Michael Carone
*Assistant Examiner*—Benjamin P Lee
(74) *Attorney, Agent, or Firm*—Klein, O'Neill & Singh, LLP

(57) ABSTRACT

An apparatus and method for rotary code-based control for command systems. A flight deck module comprises a knob connected to a shaft; a plurality of sensors affixed to a surface of a printed circuit board, the printed circuit board connected to the shaft; and a carrier platter. The carrier platter is connected to the shaft and a plurality of sources is affixed onto a first side of the carrier platter in an arcuate orientation (such as in a circular fashion along the circumference of the carrier platter or spanning a sector of a circle).

14 Claims, 14 Drawing Sheets

FIGURE 5B
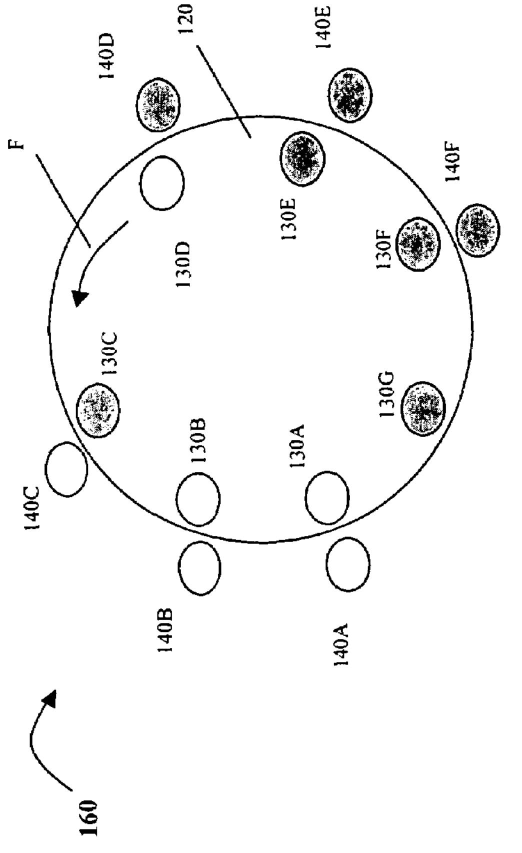
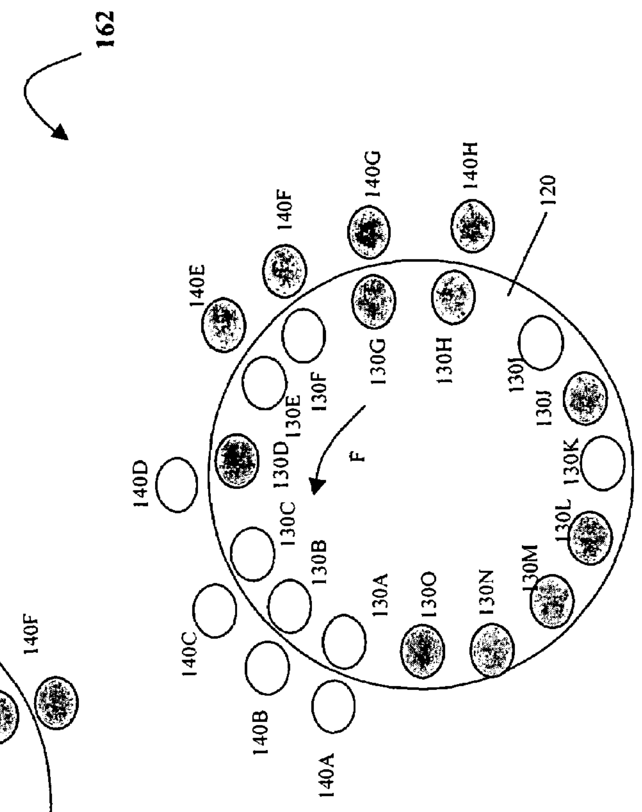
FIGURE 6B

METHOD AND SYSTEM FOR ROTARY CODE-BASED CONTROL

BACKGROUND OF THE INVENTION

1. Field of the Invention

The present invention relates to systems control modules, and more particularly, to flight deck panels for aircraft.

2. Background

The flight deck (cockpit) area of an aircraft includes a large number of different types of switches and knobs for controlling different aircraft system functions. Due to the large number of control and indicating devices, they are arranged in modules, encompassing large areas viewable and reachable by the flight crew.

Modules having similar control or indicating functions may be arranged and located similarly in the flight decks of different aircraft, for ease of use by the flight crew. Also, similar switches and knobs, both with respect to look and feel, are provided for similar functions. For example, a flight deck module may incorporate a row of rotary switches, push button switches, or rheostats. A particular panel may or may not incorporate knobs or buttons, and some panels may consist solely of banks of gauges to indicate the status of different flight control systems.

Typical aircraft rotary controls often provide two groups of control knob position signals (two poles) for redundancy. Control knobs have two or more positions that are encoded. Such position signals are often binary encoded. For in-between control knob positions (for example, the control knob may be in a position in-between switch detents), positions indicated by the pole signals often differ. Thus, position detection is inhibited until a valid position is reached (such as when the control knob reaches a detent).

Various methods for implementing rotary knob controls on flight deck modules have been attempted. One conventional method is shown in FIG. 1A, which shows an apparatus 10 for rotary code-based control. A magnet carrier platter 20 carries magnets 30 on its surface. The magnets 30 are placed in a radial orientation. Hall-effect sensors 40 are mounted near the magnet carrier platter 20 at positions corresponding to the location of the magnets 30. Using a hall-effect sensor 40, a voltage is generated transversely to the current flow direction, if a magnetic field is applied perpendicularly to the magnet carrier platter 20.

Voltage is generated by the effect of an external magnetic field acting perpendicularly to the direction of current. A hall-effect sensor 40 senses the magnet fields produced by magnets 30 and generate an indicator position signal in response thereto.

As shown in FIG. 1B, redundancy is often attempted by using two magnet carrier platters 20. A large number of magnets 30 are oriented radically on the surface of one of the magnet carrier platter 20. A large number of magnets 32 are also oriented radially on the surface of another magnet carrier platter 20. Each of the magnets 32 is in vertical alignment with each of the magnets 30 for redundancy.

Such, for example, radial orientation of magnets 30 has several disadvantages. Two magnet carrier platters are needed, thus increasing overall cost of flight deck module controls. Costs are also high since many magnets are used to span the magnet carrier platter radius. The radial orientation of the magnets also requires larger magnet carrier platters due to crowding at the location of the magnets at the smaller radial positions nearer the center of the magnet carrier platters. Because the radial orientation often involves crowding at smaller radii, invalid codes (such as in-between position codes) are more likely to be produced for in-between positions.

Therefore, what is desired is a system that can code rotary positions at lower cost, with smaller parts, and with a lesser likelihood of producing invalid codes for in-between positions.

SUMMARY OF THE INVENTION

In one aspect of the present invention, a flight deck module comprises a knob connected to a shaft; a plurality of sensors affixed to a surface of a printed circuit board, the printed circuit board connected to the shaft; a carrier platter, the carrier platter connected to the shaft; and a plurality of sources affixed onto a first side of the carrier platter in an arcuate orientation.

In another aspect of the present invention, a system for rotary code-based control comprises a knob connected to a shaft; a plurality of hall-effect sensors affixed to a surface of a printed circuit board, the printed circuit board connected to the shaft; and a carrier platter with a plurality of magnets affixed along the circumference of a first side of the carrier platter, the carrier platter connected to the shaft.

In yet another aspect of the present invention, an apparatus for rotary code-based control comprises a systems control panel, wherein the systems control panel includes; a front plate; a carrier platter with a plurality of magnets affixed along the circumference of both sides of the carrier platter; a plurality of hall-effect sensors affixed to a surface of a printed circuit board, wherein the printed circuit board is spaced a predetermined distance from a surface of the carrier platter; and a shaft intersecting with the front plate, the carrier platter, and the printed circuit board for rotating the carrier platter.

In still another aspect of the present invention, A method for rotary code-based control of control knob position signals comprises situating a plurality of magnets in an arcuate orientation on a first surface of a carrier platter; associating a hall-effect sensor with each of the plurality of magnets; placing the hall-effect sensor at a predetermined distance from the carrier platter; and rotating the magnets over the hall-effect sensor in a serial order.

In still yet another aspect of the present invention, a method for selecting a number of sensors used for rotary code-based control of control knob position signals comprises choosing a mathematical base for a rotary code; computing a sum of a desired number of control knob positions and one; computing a logarithm of the mathematical base for the sum; and selecting the logarithm (rounded up to the nearest whole number) as the number of sensors.

In a still further aspect of the present invention, a method for generating available sensor states for a rotating code, for rotary code-based control using a sensor comprises selecting a sensor starting state; analyzing a sensor state when a control position is changed in a given direction using a hierarchical tree with the sensor starting state as a root; and expanding the hierarchical tree for finding available sensor states.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 5B is a plan view of a magnet/sensor layout for a code sequence from the tree diagram of FIG. 5A;

FIG. 6B is a plan view of a magnet/sensor layout for a code sequence from the tree diagram of FIG. 6A;

DETAILED DESCRIPTION OF THE PREFERRED EMBODIMENTS

The following detailed description is of the best currently contemplated modes of carrying out the invention. The detailed description is not to be taken in a limiting sense, but the detailed description is made merely for the purpose of illustrating the general principles of the invention, since the scope of the invention is best defined by the appended claims.

Broadly, the present invention generally provides an apparatus and method for rotary code-based control for command systems. The rotary code-based system produced according to the present invention may find beneficial use in many industries including aerospace and industrial applications. Although the following discussion may use an aircraft flight deck panel as an exemplary demonstration, it is to be understood that this discussion is not limiting and that the present invention may be used in other suitable applications.

By orienting magnets and sensors in an arcuate orientation (such as, in a circular fashion along the circumference of a carrier platter or spanning a sector of a circle) instead of the conventional radial orientation, several advantages over the typical methods result. Multiple carrier platters are usually not needed as the arcuate orientation enables rotary code-based control with one carrier platter with fewer total magnets, decreasing costs for flight deck module controls. The arcuate orientation of the magnets on the carrier platter requires smaller magnet carrier platters because no crowding of the magnets at smaller radii is needed. Alignment inaccuracies are less likely to produce improper codes using the present invention.

Figure 1A:
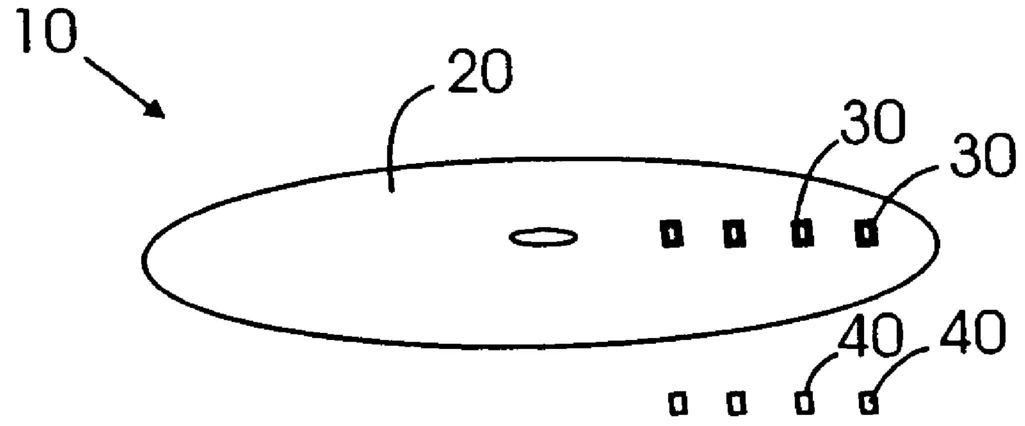
FIGURE 1A (Prior Art)
FIG. 1A is a perspective view of an apparatus for rotary code-based control, as found in the prior art.
Figure 1B:
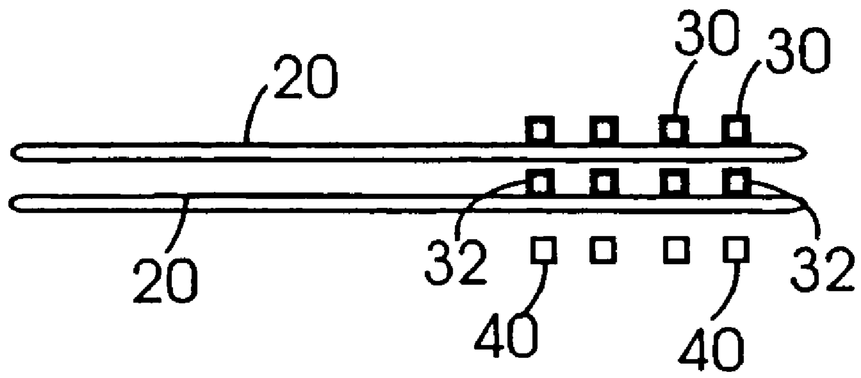
FIGURE 1B (Prior Art)
FIG. 1B is a side view of an apparatus for rotary code-based control, as found in the prior art.
Figure 2A:
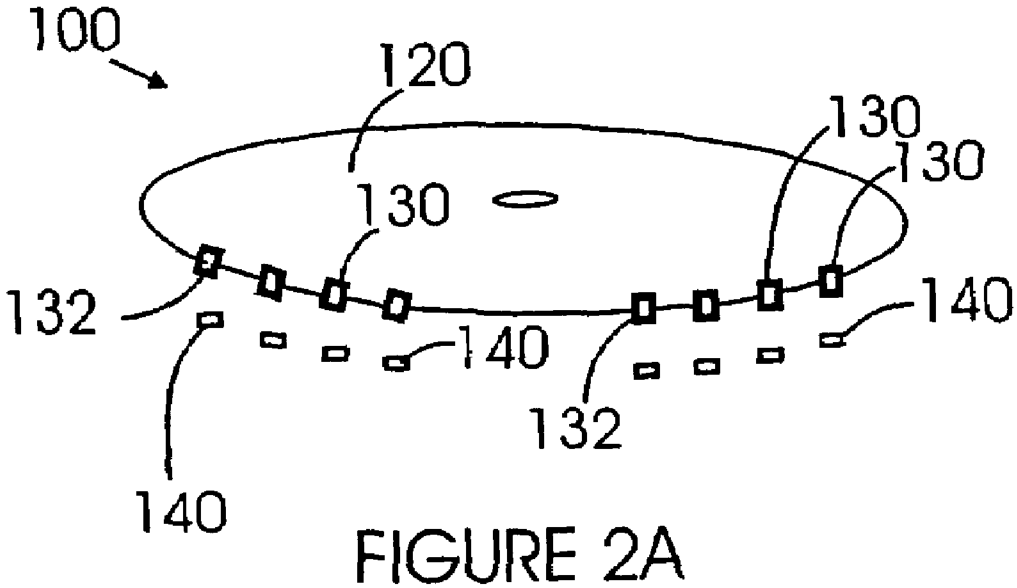
FIG. 2A is a perspective view of an apparatus for rotary code-based control, according to an embodiment of the present invention.

In more specifically describing the present invention and as can be appreciated from FIG. 2A, the present invention may provide an apparatus 100 for rotary code-based control using one carrier platter 120. The carrier platter 120 may comprise aluminum, a semi-conductor material, or any suitable durable material. Sources 130, 132 may be affixed along the circumference of surfaces of the carrier platter 120 in an arcuate orientation. Sources 130, 132 may be magnets, such as permanent magnets.

Sensors 140 may be positioned to cooperate with the magnets 130, 132 for detecting relative position of the magnets 130, 132 and the sensors 140. The sensors 140 may be hall-effect sensors. Any of the magnets 130, 132, and the sensors 140 may be positioned in an arcuate orientation along the circumference of the carrier platter 120. The sensors 140 may be any useful magnetic sensor (analog or digital) such as hall-effect sensors, MR sensors, GMR sensors, reed switches, and the like.

Figure 2B:
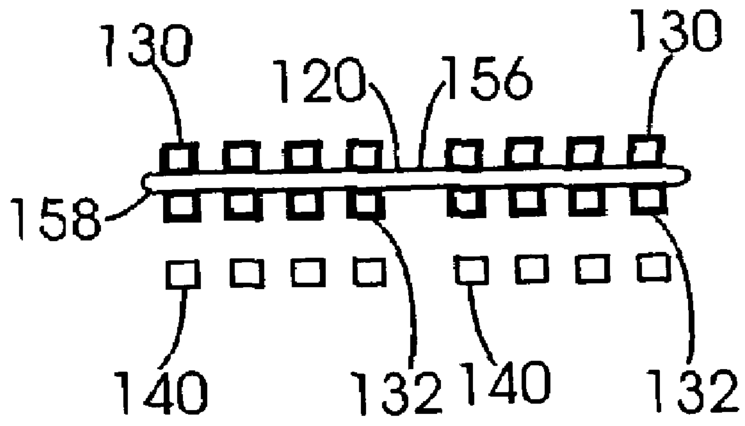
FIG. 2B is a side view of the apparatus for rotary code-based control in FIG. 2A.

FIG. 2B shows a side view of the apparatus 100 for rotary code-based control in FIG. 2A. A plurality of magnets 130 may be affixed onto a first side 156 of carrier platter 120 while a plurality of magnets 132 may be affixed onto a second side 158 of the carrier platter 120 for redundancy. As the apparatus 100 is rotated, magnets 130, 132 rotate over the sensors 140 in a serial order. Binary codes may not be readily obtainable, so a translation may be needed.

To lessen the likelihood of invalid codes at in-between positions, sensors 140 may be analog magnetic sensors with multiple threshold sensing. The analog magnetic sensors may be designed to sense predetermined values for magnetic field strengths.

A first voltage produced by analog sensors at a valid position (such as when one or more magnets are aligned with one or more sensors) represents a first valid position threshold. A second voltage produced by analog sensors at another valid position represents a second valid position threshold. The second voltage may be higher in value than the first voltage.

In such a case, the second voltage represents an upper threshold while the first voltage represents a lower threshold. If any one of the sensors 140 on a pole produces an output beyond a given set of thresholds (such as valid position thresholds), then the state of the other sensors 140 (on the pole) may be checked using a lesser threshold. Due to tolerance concerns and sensor variations, one sensor 140 may detect a new position before the other sensors 140 detect the new position. This situation may be accommodated by changing the outputs of the other sensors 140 by an appropriate amount so that the new position is detected using multiple threshold sensing.

Although the sensor 140 outputs may be interpreted using two states (binary coding), a method using three or more states (using base 3 or higher) may be desirable to reduce the number of sensors 140 needed.

Figure 3:
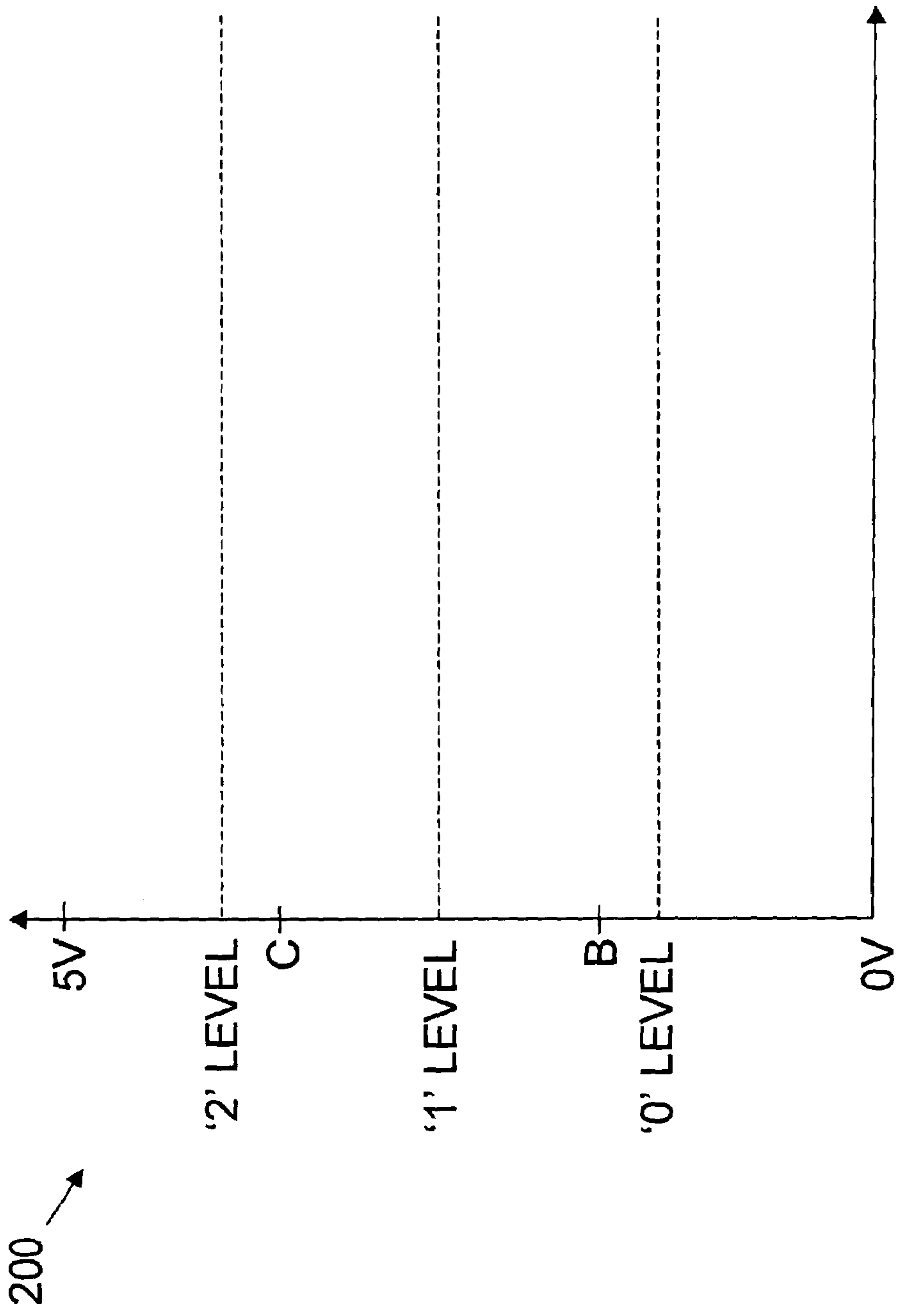
FIG. 3 is a plot of multiple position thresholds, according to another embodiment of the present invention.

FIG. 3 shows a plot 200 of position thresholds. In this example, a 5-volt supply and analog hall-effect sensors 140 with a 2.5-volt output are used. These conditions are obtainable without using a magnet bias. If any one of the sensors 140 on a pole has an output (voltage or current) value at or above level 2 or an output value at or below level 0, then the state of the sensors 140 on that pole are checked against state level thresholds ("levels") B and C.

The sensor output is a measurement of voltage, current, or any other output produced by the sensor 140. The vertical axis in FIG. 3 represents sensor output in volts.

As shown in FIG. 3, level B does not necessarily need to be set precisely halfway between level 0 and level 1. Likewise, as shown in FIG. 3, level C does not necessarily need to be set precisely halfway between level 1 and level 2. Nevertheless, it is to be understood that level B may be set at a point halfway between level 0 and level 1. Accordingly, level C may be set at a point halfway between level 1and level 2.

Levels 0, 1, and 2 may be set (for example, by sensor and magnet calibration) so that the sensor output levels ensure that the sensed states are 0, 1, and 2, respectively.

Level 0 may represent sensor state 0 wherein, for example, the south pole of a magnet 132 near a sensor 140 is pointed towards the sensor (north pole is pointed away from the sensor 140).

Level 1 may represent sensor state 1 wherein, for example, no magnet 132 is near the sensor 140.

Level 2 may represent sensor state 2 wherein, for example, the north pole of a magnet 132 near a sensor 140 is pointed towards the sensor 140 (south pole is pointed away from the sensor 140).

In-between positions occur, for example, when a magnet 132 is near enough to be sensed by a sensor 140, but not near enough to the sensor 140 to register an integral state. For example, if the south pole of a magnet 132 is initially pointed towards a sensor 140 (state 0) and if the magnet 132 begins to move away from the sensor 140 such that no magnet 132 is near the sensor 140 (state 1), the actual level sensed would be between level 0 and level 1.

Actual levels sensed are dependent upon the sensor 140 and magnet 132 characteristics. Variances from integral levels 0, 1, and 2 occur due to various causes, such as mechanical tolerances, sensor tolerances, temperature fluctuations, and the like. If a detent position is reached (or when a magnet 132 is aligned directly above or below a sensor 140) the detected level may be below level 0 (south pole aligned with the sensor 140) or above level 2 (north pole aligned with the sensor 140).

Levels B and C are set as intermediate thresholds to determine the state of sensors 140 that are near to levels 0 and 2 so that undesired in-between position states are accommodated.

If any sensor output value begins to cross a threshold (such as level 0 or level 2), then the state of any other sensors are determined using a different threshold (such as level B or level C).

Ideally, the mechanical tolerances and the sensing tolerances of the sensors and magnets are matched closely enough so that all sensor states are correctly determined. For example, if at least one of the sensor output values is at or above level 2, then using level C as a threshold for the other sensors ensures that the sensor states are correctly determined.

Likewise, if at least one of the sensor output values is at or below level 0, then using level B as a threshold for the other sensors ensures that the sensor states are correctly determined.

Threshold detection may be performed through the use of analog comparators or analog-to-digital converters (A/D converters). Code translation may be implemented with discrete logic, programmable logic (such as a Field Programmable Gate Application, "FPGA" or a Programmable Logic Device, "PLD"), custom logic devices (such as an Application Specific Integrated Circuit, "ASIC"), or by a microprocessor. Micro-controllers with integrated analog multiplexers and A/D converters may implement threshold detection and provide code translation.

Figure 4A:
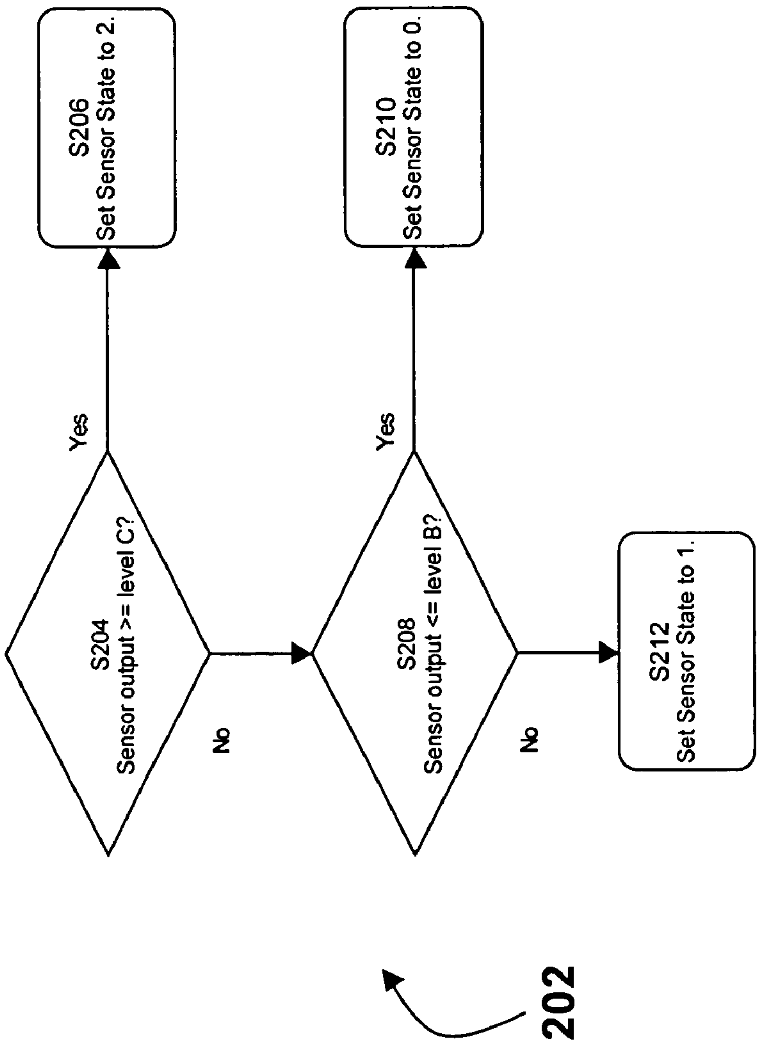
FIG. 4A is a flow diagram to illustrate how individual sensor states are set using the plot in FIG. 3.

Sensor State Initialization (Before Rotation):

FIG. 4A shows a flow diagram 202 to illustrate how individual sensor states are set using the plot in FIG. 3. Setting each sensor state individually may initialize each sensor 140.

In step S204, each of the sensor outputs on a pole (such as sensor voltage, which may be based upon the strength of a magnetic field produced by a magnet 132) is compared with level C (shown in FIG. 3), an intermediate threshold level.

If sensor output is greater than or equal to level C, then in step S206, the sensor state is set (initially) as state 2.

If the sensor output, in step S204, is less than level C, then the process moves to step S208.

In step S208, the sensor output is compared to intermediate threshold level B and if the sensor output is less than or equal to B, then in step S210, the sensor state is set (initially) as state 2.

If in step S208, the sensor output is greater than B, then in step S212, the sensor state is set (initially) as state 1.

Sensor states change when rotating the magnets 130 over the hall-effect sensor 140 (as shown in FIGS. 2A and 2B) in a serial order. An angular offset may exist between the sensor groups (poles). As the carrier platter 120 (shown in FIGS. 2A and 2B) is rotated, one of the poles may attain a valid state while the other poles are still in an in-between state.

In this situation, the initial sensor state (valid state) is set while the state (in-between state) of the remaining sensors is determined through lower threshold state detection (described below in FIG. 4C) or upper threshold state detection (described below in FIG. 4D).

Figure 4B:
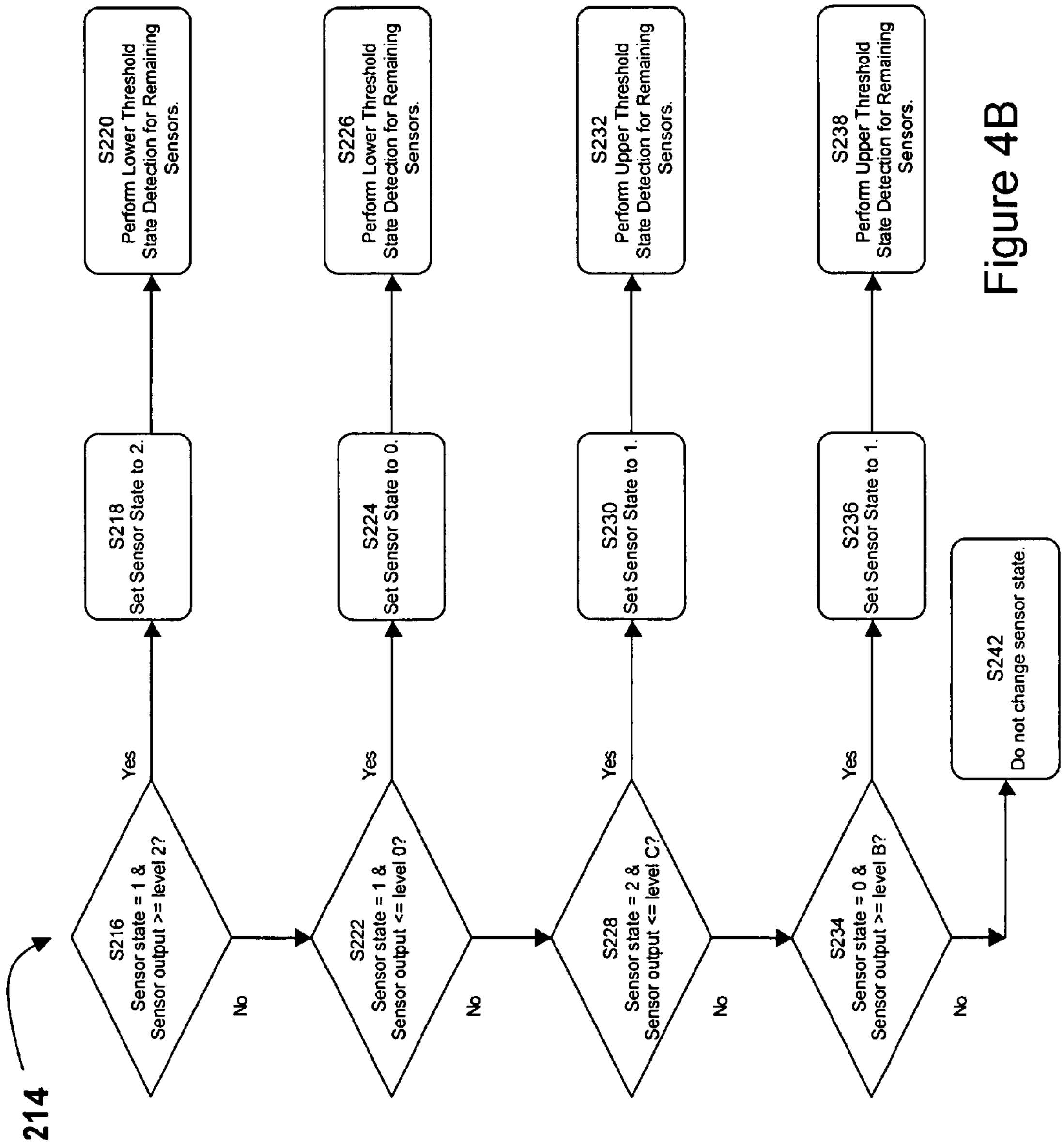
FIG. 4B is a flow diagram to illustrate how initial sensor states, resulting from rotation of sensors on a platter, are determined using the plot in FIG. 3.

Detection of First Sensor State After Rotation:

FIG. 4B shows a flow diagram 214 to illustrate how initial sensor states, resulting from rotation of carrier platter 120 (shown in FIGS. 2A and 2B), are determined using the plot in FIG. 3. When the magnets 132 rotate with respect to the sensors 140, a first sensor may be in a valid state while the remaining sensors may be at invalid in-between states.

For example, during serial rotation, a first magnet 132 may be appropriately aligned with a first sensor 140. The remaining magnets 132 may not be aligned with corresponding sensors 140 to the same extent as the first magnet 132 is aligned with a first sensor 140. In this situation, the first sensor would be in an initial sensor state (valid state) while the remaining sensors would be in in-between states (invalid states).

Continuing with FIG. 4B, in step S216, the first sensor state (valid state) is compared to sensor state 1 and the sensor output is compared to level 2. If the first sensor state is equal to 1 and the sensed first sensor output is greater than or equal to level 2, then the process moves to step S218.

In step S218, the first sensor state is set to 2. From step S218, the process moves to step S220. Step S220 proceeds to perform lower threshold state detection for the remaining sensors 140. Lower threshold state detection may be performed as described in FIG. 4C below.

If the first sensor state in step S216 is not equal to 1 or the sensed first sensor output is less than level 2, then the process moves to step S222.

In step S222, the first sensor state (valid state) is compared to sensor state 1 and the sensor output is compared to level 0.

If the first sensor state is equal to 1 and the sensed first sensor output is less than or equal to level 0, then the process moves to step S224.

In step S224, the first sensor state is set to 0. From step S224, the process moves to step S226. As described in step S220 above, step S226 proceeds to perform lower threshold state detection for the remaining sensors 140 (described below in FIG. 4C).

If the first sensor state in step S222 is not equal to 1 or the sensed first sensor output is greater than level 0, then the process moves to step S228.

In step S228, the first sensor state (valid state) is compared to sensor state 2 and the sensed sensor output is compared to level C. If the first sensor state is equal to 2 and the sensed first sensor output is less than or equal to level C, then the process moves to step S230.

In step S230, the first sensor state is set to 1. From step S230, the process moves to step S232. As opposed to step S226 above, step S232 proceeds to perform upper threshold state detection for the remaining sensors 140 (described below in FIG. 4D).

If the first sensor state in step S228 is not equal to 2 or the sensed first sensor output is greater than level C, then the process moves to step S234.

In step S234, the first sensor state (valid state) is compared to sensor state 0 and the sensed sensor output is compared to level B. If the first sensor state is equal to 0 and the sensed first sensor output is greater than or equal to level B, then the process moves to step S236.

In step S236, the first sensor state is set to 1. From step S236, the process moves to step S238. As described above in step S232 above, step S238 proceeds to perform upper threshold state detection for the remaining sensors 140 (described below in FIG. 4D).

If the first sensor state in step S234 is not equal to 0 or the sensed first sensor output is as less than level B, then the process moves to step S242 wherein no sensor states are changed.

Figure 4C:
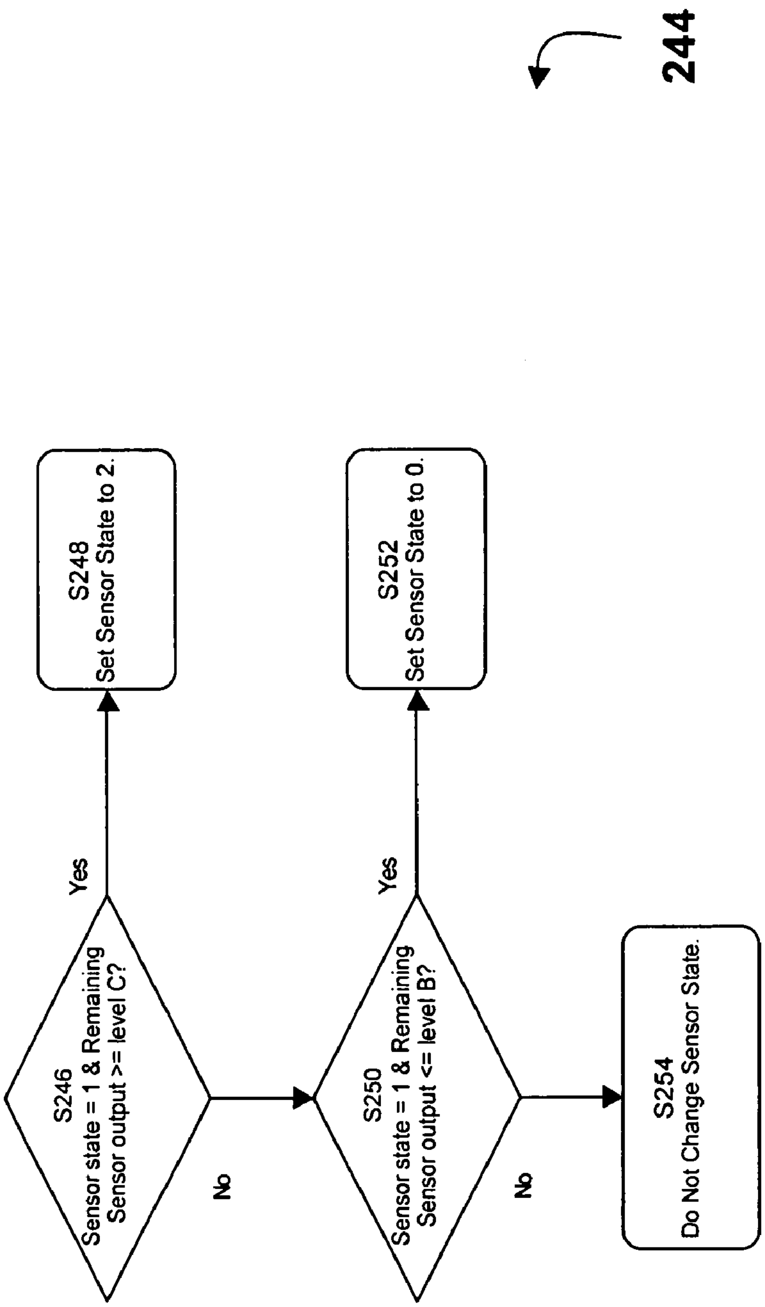
FIG. 4C is a flow diagram to illustrate how lower threshold states are determined using the plot in FIG. 3.

Lower Threshold State Detection:

FIG. 4C shows a flow diagram 244 to illustrate how lower threshold states for remaining sensors are determined using the plot in FIG. 3. Once the first sensor state is set (as in FIG. 4B above), then the remaining sensor states are individually set by determining the previous sensor state (before rotation) and sensing the sensor output (after rotation).

In step S246, the state of any remaining sensor is compared to state 1 and the sensed sensor output is compared to intermediate threshold level C. If the sensor state is equal to 1 and the sensed sensor output is greater than or equal to level C, then the process moves to S248, wherein the sensor state is set to 2.

If the sensor state in step S246 is not equal to 1 or if the sensed sensor output is less than level C, then the process moves to step S250.

In step S250, the state of the remaining sensor is compared to state 1 and the sensed sensor output is compared to intermediate threshold level B. If the sensor state is equal to 1 and the sensed sensor output is less than or equal to level B, then the process moves to step S252, wherein the sensor state is set to 0.

If the sensor state in step S250 is not equal to 1 or if the sensed sensor output is greater than level B, then the process moves to step S254, wherein the sensor state is not changed. The process in FIG. 4C may be repeated for each remaining sensor requiring lower threshold state detection after rotation.

Figure 4D:
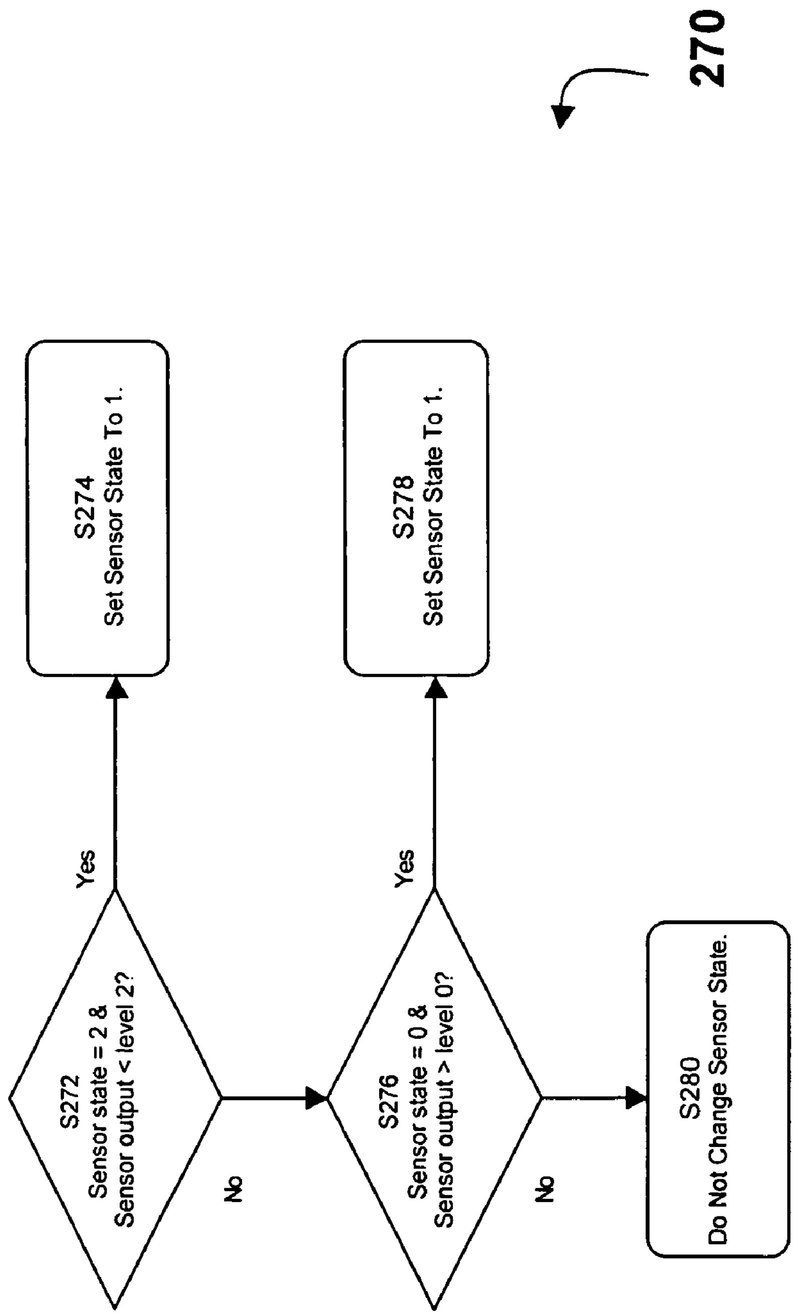
FIG. 4D is a flow diagram to illustrate how upper threshold states are determined using the plot in FIG. 3.

Upper Threshold State Detection:

FIG. 4D shows a flow diagram 270 to illustrate how upper threshold states are determined by using the plot in FIG. 3. If lower threshold state detection is not indicated from the process of FIG. 4B (such as from step S220 or step S226), then upper threshold state detection is performed (such as indicated from step S232 or step S238 of FIG. 4B).

In step S272, the remaining sensor state and the sensed output is compared with state 2 and level 2. If the sensor state is equal to 2 and the sensed sensor output is less than level 2, then the process moves to step S274, wherein the sensor state is set to 1.

If the sensor state in step S272 is not equal to 2 or if the sensor output in step S272 is greater than or equal to level 2, then the process moves to step S276.

In step S276, the sensor state is compared to 0 and the sensed sensor output is compared to level 0. If the sensor state equals 0 and the sensed sensor output is greater than level 0, then the process moves to step S278, wherein the sensor state is set to 1.

If the sensor state in step S276 is not equal to 0 or if the sensed sensor output is less than or equal to level 0, then the process moves to step S280, wherein the sensor state is not changed.

The process in FIG. 4D may be repeated for each remaining sensor that requires upper threshold state detection after rotation.

The suppression of invalid codes is not limited to the dual-threshold method presented above. In some cases, a different method is used, such as when states of base 4 or higher are used.

Yet another option is to introduce an angular offset between the sensor groups (poles). As the carrier platter 120 (shown in FIGS. 2A and 2B) is rotated, one of the poles may attain a valid state while the other may still be in an in-between state. When a detent is reached, both poles may attain the same valid state, although one pole is offset slightly clockwise from a nominal detent position and the other slightly counter-clockwise from the nominal detent position.

Binary Code Tree:

Binary rotating codes may be calculated by analyzing the sensor states when the knob control position is changed in a given direction, such as clockwise or counter-clockwise (anti-clockwise). If a known starting sensor state is selected, then the analysis is performed using a hierarchical tree with the starting sensor state as the root.

Figure 5A:
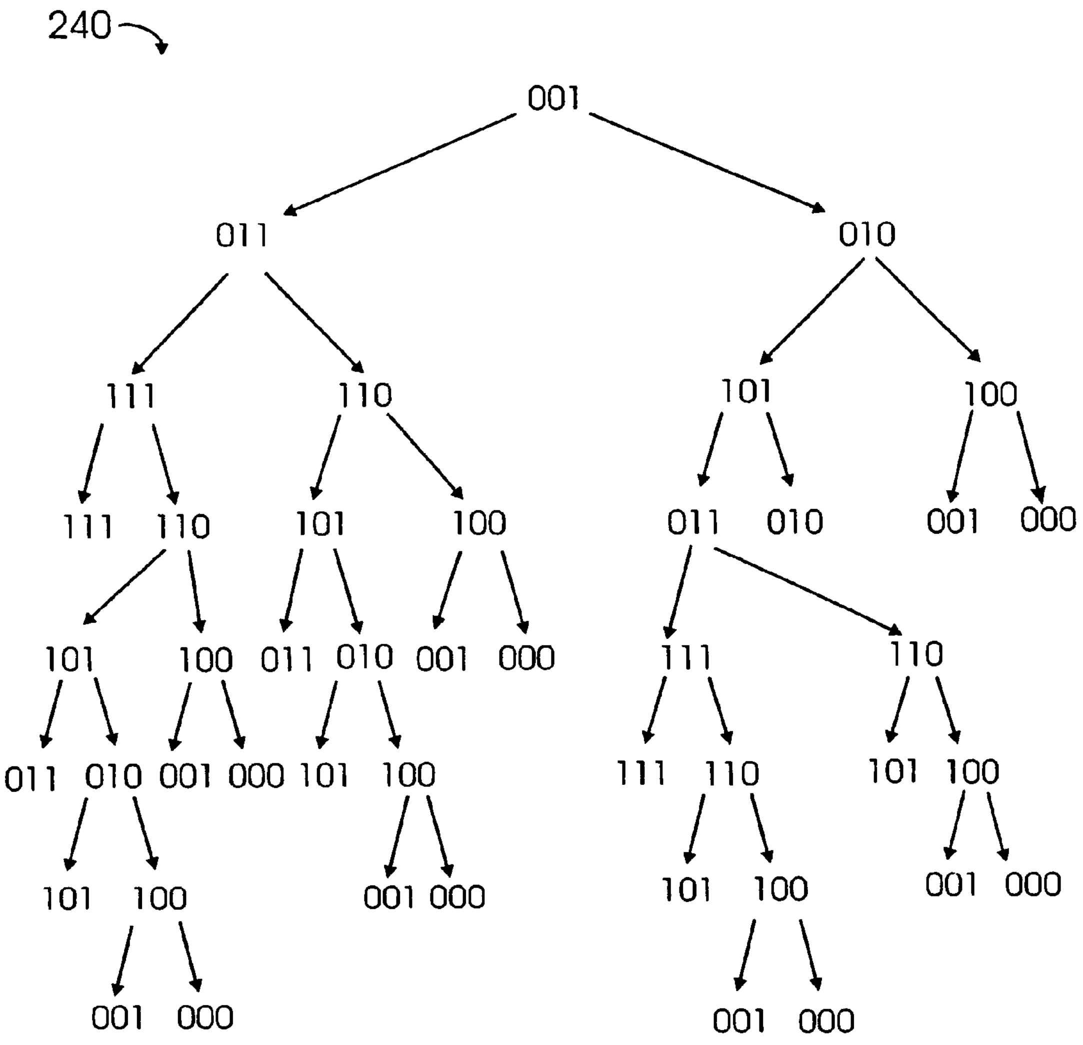
FIG. 5A is a tree diagram of binary rotating codes, according to a further embodiment of the present invention.

Such a tree 240 is shown in FIG. 5A. This example can be understood to represent available values when using a set of three sensors, represented by the three digits in each available state. The exemplary design uses three sensors with a starting state of 001. When a sensor state is reached such that the state is the same as the starting state (such as level 001 of the tree 240) or if the state represents an in-between position (in this example, 000), then the tree 240 is not expanded further. Such a termination point may represent a completed code sequence.

Similar trees may be constructed in which the number of digits in the starting state is equal to the number of sensors. Binary coding, such as used in tree 240, may be used with digital sensors. In this case, the number of sensors is equal to a logarithm, to the base 2, of the number of knob control positions, rounded up to the nearest whole number. The number of codes, excluding the in-between position code, may be equal to the number of control knob positions.

The tree nodes terminate when any of the following codes is found:

000 (in-between position—not allowed);

001 (start of code sequence); and a repeated code (a code found higher on a branch).

For example, when a sensor state is reached such that the state (such as level 111 of the tree 240) is the same as a previous state (such as level 111 of the tree 240), but not the same as the starting state (such as level 001 of the tree 240), then the code sequence is rejected (the code sequence is not usable).

Binary Code Sequences:

Code sequences may be obtained by visiting all of the branches of the tree diagram 240 in FIG. 5A. A right-to-left transversal provides the following code sequences (the codes are shown in a decimal base):

1,2,4,0 terminated by 0
1,2,4,1 valid sequence (length=3)
1,2,5,2 terminated by repeated code (2)
1,2,5,3,6,4,0 terminated by 0
1,2,5,3,6,4,1 valid sequence (length=6)
1,2,5,3,6,5 terminated by repeated code (5)
1,2,5,3,7,6,4,0 terminated by 0
1,2,5,3,7,6,4,1 valid sequence (length=7)
1,2,5,3,7,7 terminated by repeated code (5)
1,3,6,4,0 terminated by 0
1,3,6,4,1 valid sequence (length=4)
1,3,6,5,2,4,0 terminated by 0
1,3,6,5,2,4,1 valid sequence (length=6)
1,3,6,5,2,5 terminated by repeated code (5)
1,3,7,6,4,0 terminated by 0
1,3,7,6,4,1 valid sequence (length=6)
1,3,7,6,5,2,4,0 terminated by 0
1,3,7,6,5,2,4,1 valid sequence (length=7)
1,3,7,6,5,2,5 terminated by repeated code (5)
1,3,7,6,5,3 terminated by repeated code (3)
1,3,7,7 terminated by repeated code (7).

Two of the sequences provide seven positions:

1,2,5,3,7,6,4,1, corresponding to 001, 011, 111, 110, 101, 010, 100 (a left branch); and 1,3,7,6,5,2,4,1, corresponding to 001, 010, 101, 011, 111, 110, 100 (a right branch).

If a logarithm of the number of desired control knob positions plus one rule is observed for the number of sensors (per pole), then a sequence can be found that accommodates the design when tree 240 is employed.

For example, if the logarithm, for the base two (2), of the number of desired control knob positions plus one is observed:

$\log_2(7\text{ positions}+1)=\log_2(8)=$Three (3) sensors.

The number of magnets used is equal to a number that is half the number of control knob positions used (7), rounded up to the nearest whole number:

0.5(7 positions)=3.5;

rounding up(3.5)=4.

Thus, the tree 240, shown in FIG. 5A, is used to design a computer program to support choosing possible code sequences with three sensors and four magnets that yields seven control knob positions.

7-Position Magnet/Sensor Layout:

A magnet/sensor layout 160 is shown in FIG. 5B for the first sequence A, above, taken from the tree 240 of FIG. 5A. Three sensors 140A,140B,140C are used with a duplicate set of sensors 140D,140E,140F used for redundancy. Sensor 140A and sensor 140D are the most significant bits. The sensors 140A-F may be situated outside the circular carrier platter 120. The sequence A may be obtained by rotating the carrier platter 120 in direction F (such as counter-clockwise or anti-clockwise).

Magnet locations 130A-G may be situated on a surface of the carrier platter 120. White-filled circles 130A, 130B, and 130D indicate an unfilled magnet location (lacking a magnet). Black-filled circles 130C, 130E, 130F, and 130G indicate a filled magnet location (containing a magnet).

The sensors 140A-C and sensors 140D-F provide codes that are offset spatially, as shown below in binary format.

TABLE 1

| Position | Sensors 140A-C | Sensors 140D-F |
|---|---|---|
| 1 | 001 | 011 |
| 2 | 010 | 111 |
| 3 | 101 | 110 |
| 4 | 011 | 100 |
| 5 | 111 | 001 |
| 6 | 110 | 010 |
| 7 | 100 | 101 |

As shown in FIG. 5B, the magnet locations 130A and 130B may be an unfilled magnet location, while magnet location 130C may be a filled magnet location. The orientation of magnet locations 130A-C corresponds to zero (0) for 130A and 130B and to one (1) for 130C, resulting in the code 001 for sensors 140A-C.

The orientation of magnet locations 130D-F shown in FIG. 5B corresponds to zero (0) for 130D and to one (1) for 130E and 130F, resulting in the code 011 for sensors 140D-F.

As the carrier platter 120 is rotated, in direction F, from an in-between position to another position, the sensor 140A-F outputs transition from 000 to one of the subsequent codes shown in Table 1.

For example, when the carrier platter 120 is rotated, in direction F, to a subsequent valid position, then unfilled magnet location 130B will be adjacent to sensor 140A (0), filled magnet location 130C will be adjacent to sensor 140B (1), and unfilled magnet location 130D will be adjacent to sensor 140C (0), resulting in the code 010 for sensors 140A-C (position 2 in Table 1).

Likewise, filled magnet location 130E will be adjacent to sensor 140D (1), filled magnet location 130F will be adjacent to sensor 140E (1), and filled magnet location 130G will be adjacent to sensor 140F (1), resulting in the code 111 for sensors 140D-F (position 2 in Table 1).

The carrier platter 120 may be further rotated in direction F, such that the codes transition to the subsequent codes shown in Table 1 (for positions 3-7).

Sensor offsetting may be used, in that sensors 140A-C may be situated at a slight counter-clockwise (anti-clockwise) offset and the sensors 140D-F may be situated at a slight clockwise offset so that, as the carrier platter 120 is rotated, one of the sets of sensors (140A-C or 140D-F) may acquire a stabilized state before the other set of sensors (140D-F or 140A-C) changes from state zero (0).

Base 3 Code Sequences:

Using a numeric base greater than two (2) may enable the use of analog sensors to reduce the number of sensors and magnets. For example, a numeric base 3 coding system may be implemented using magnets mounted such that a polarity (north or south) is different. The absence of a magnet (such as an unfilled magnet position) may be set at state zero (0). A south polarity of a magnet could be at state one (1) while a north polarity of a magnet could be at state two (2).

Figure 6A:
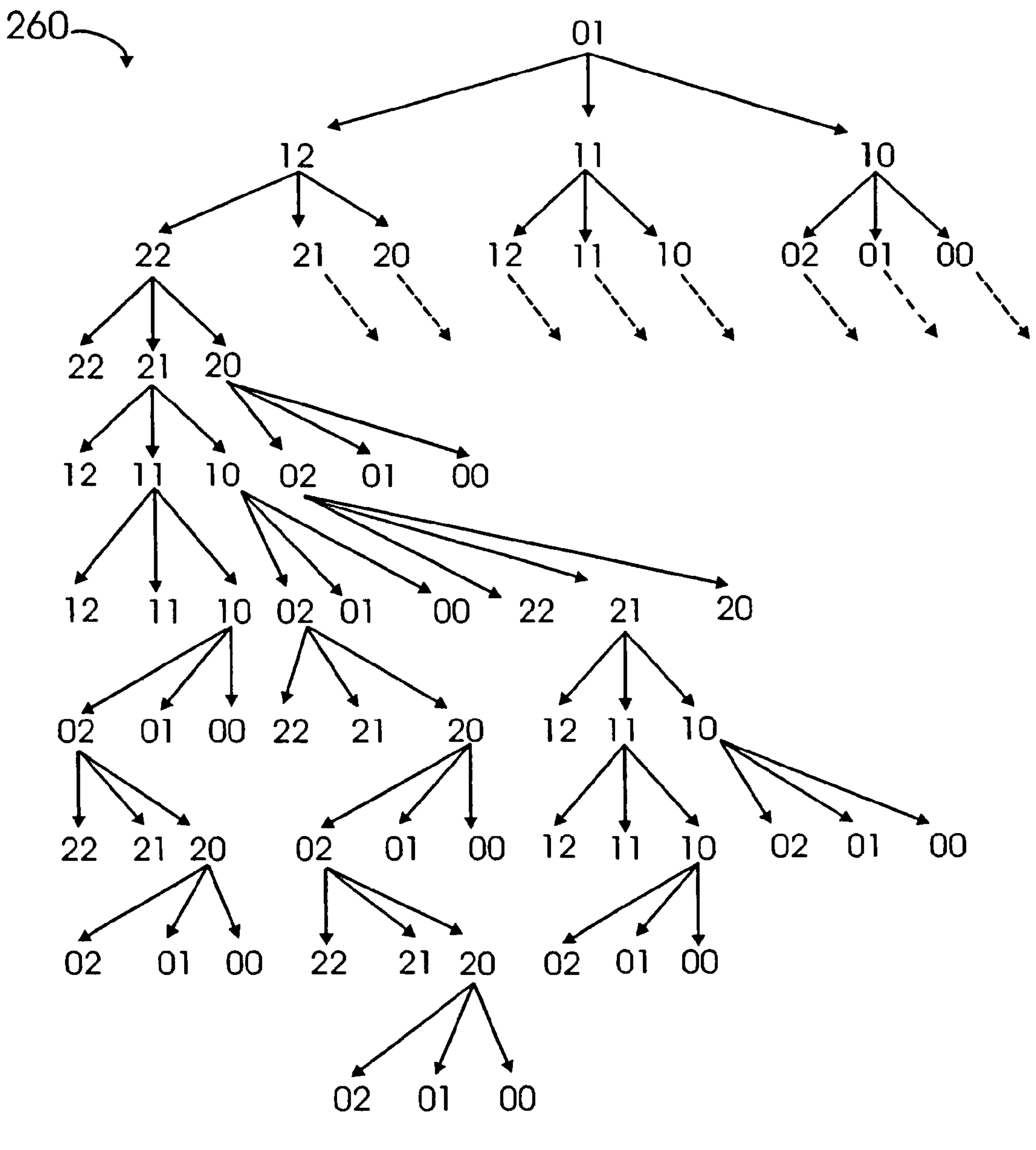
FIG. 6A is a tree diagram of base 3 rotating codes, according to yet another embodiment of the present invention.

Base 3 rotating codes may be generated using a tree 260 as shown in FIG. 6A. Tree 260 is exemplary of a two-sensor rotating code method. Due to the large size of the tree 260, only the leftmost branch of the tree 260 is shown. As can be seen in FIG. 6A, several sequences are available with only two sensors and base 3 coding, when compared with the sequences available with three sensors and binary coding in FIG. 5A. Thus, base 3 coding with analog sensors can be useful for minimizing the number of sensors needed. This would promote saving the cost of purchasing additional sensors.

With base 3 coding, the number of sensors is equal to a logarithm, to the base 3, of the number of knob control positions plus one (1), rounded up to the nearest whole number. For example, a control knob with 30 positions requires four (4) sensors (per pole);

$\log_3(30\ \text{positions}+1)=\log_3(31)\approx 3.12575;$

Rounding up(3.12575)=4.

Code sequences may be obtained by visiting all of the branches of the tree diagram 260 in FIG. 6A. A partial code sequence up to the first occurrence of a fifteen-position sequence is as follows:

1,2,4,8,0
1,2,4,8,1
1,2,4,9,2
1,2,4,9,3,6,12,8,0
1,2,4,9,3,6,12,8,1
1,2,4,9,3,6,12,9,2
1,2,4,9,3,6,12,9,3
1,2,4,9,3,6,13,10,4
12,4,9,3,6,13,10,5,10
1,2,4,9,3,6,13,10,5,11,6
1,2,4,9,3,6,13,10,5,11,7,14,12,8,0
1,2,4,9,3,6,13,10,5,11,7,14,12,8,1
1,2,4,9,3,6,13,10,5,11,7,14,12,9
1,2,4,9,3,6,13,10,5,11,7,14,13
1,2,4,9,3,6,13,10,5,11,7,15,14,12,8,0
1,2,4,9,3,6,13,10,5,11,7,15,14,12,8,1.

Rotating code sequences may be generated using computer programs that use an internal tree structure. Rotating code-trees for numeric bases greater than 3 may also be used.

15-Position Magnet/Sensor Layout:

A magnet/sensor layout 162 is shown in FIG. 6B for the first occurrence of a 15-position sequence taken from the tree 260 of FIG. 6A. Four sensors 140A, 140B, 140C, 140D are used with a duplicate set of sensors 140E, 140F, 140G, 140H used for redundancy. Sensor 140A and sensor 140E are the most significant bits. The sensors 140A-H may be situated outside the circular carrier platter 120. The 15-position sequence may be obtained by rotating the carrier platter 120 in direction F (such as counter-clockwise or anti-clockwise).

Magnet locations 130A-O may be situated on a surface of the carrier platter 120. White-filled circles 130A, 130B, 130C, 130E, 130F, 130I, and 130K indicate an unfilled magnet location (lacking a magnet). Black-filled circles 130D, 130G, 130H, 130J, 130L, 130M, 130N, and 130O indicate a filled magnet location (containing a magnet).

The sensors 140A-D and sensors 140E-H provide codes that are offset spatially, as shown below in base three format.

TABLE 2

| Position | Sensors 140A-D | Sensors 140E-H |
|---|---|---|
| 1 | 0001 | 0011 |
| 2 | 0010 | 0110 |
| 3 | 0100 | 1101 |
| 4 | 1001 | 1010 |
| 5 | 0011 | 0101 |
| 6 | 0110 | 1011 |
| 7 | 1101 | 0111 |
| 8 | 1010 | 111 |
| 9 | 0101 | 1110 |
| 10 | 1011 | 1100 |
| 11 | 0111 | 1000 |
| 12 | 1111 | 0001 |
| 13 | 1110 | 0010 |
| 14 | 1100 | 0100 |
| 15 | 1000 | 1001 |

As shown in FIG. 6B, the magnet locations 130A, 130B, and 130C may be unfilled magnet locations, while magnet location 130D may be a filled magnet location. The orientation of magnet locations 130A-D corresponds to zero (0) for 130A-C and to one (1) for 130D, resulting in the code 0001 for sensors 140A-D.

The orientation of magnet locations 130E-H shown in FIG. 6B corresponds to zero (0) for 130E AND 130F and to one (1) for 130G and 130H, resulting in the code 0-11 for sensors 140E-H.

As the carrier platter 120 is rotated, in direction F, from an in-between position (0000) to another position, the sensor 140A-H outputs transition from 0000 to one of the subsequent codes shown in Table 2.

For example, when the carrier platter 120 is rotated, in direction F, to a subsequent valid position, then unfilled magnet location 130B will be adjacent to sensor 140A (0), unfilled magnet location 130C will be adjacent to sensor 140B (0), filled magnet location 130D will be adjacent to sensor 140C (1), and unfilled magnet location 130E will be adjacent to sensor 140D, resulting in the code 0010 for sensors 140A-D (position 2 in Table 2).

Likewise, unfilled magnet location 130F will be adjacent to sensor 140E (0), filled magnet location 130G will be adjacent to sensor 140F (1), filled magnet location 130H will be adjacent to sensor 140G, and unfilled magnet location 130I will be adjacent to sensor 140H (0), resulting in the code 0110 for sensors 140E-H (position 2 in Table 2).

The carrier platter 120 may be further rotated in direction F, such that the codes transition to the subsequent codes shown in Table 2 (for positions 3-15).

Sensor offsetting may be used, in that sensors 140A-D are situated at a slight counter-clockwise (anti-clockwise) offset and the sensors 140E-H are situated at a slight clockwise offset so that, as the carrier platter 120 is rotated, one of the sets of sensors (for example, sensors 140A-D) acquires a stabilized state before the other set of sensors (for example, sensors 140E-H) changes from state 0.

Figure 7:
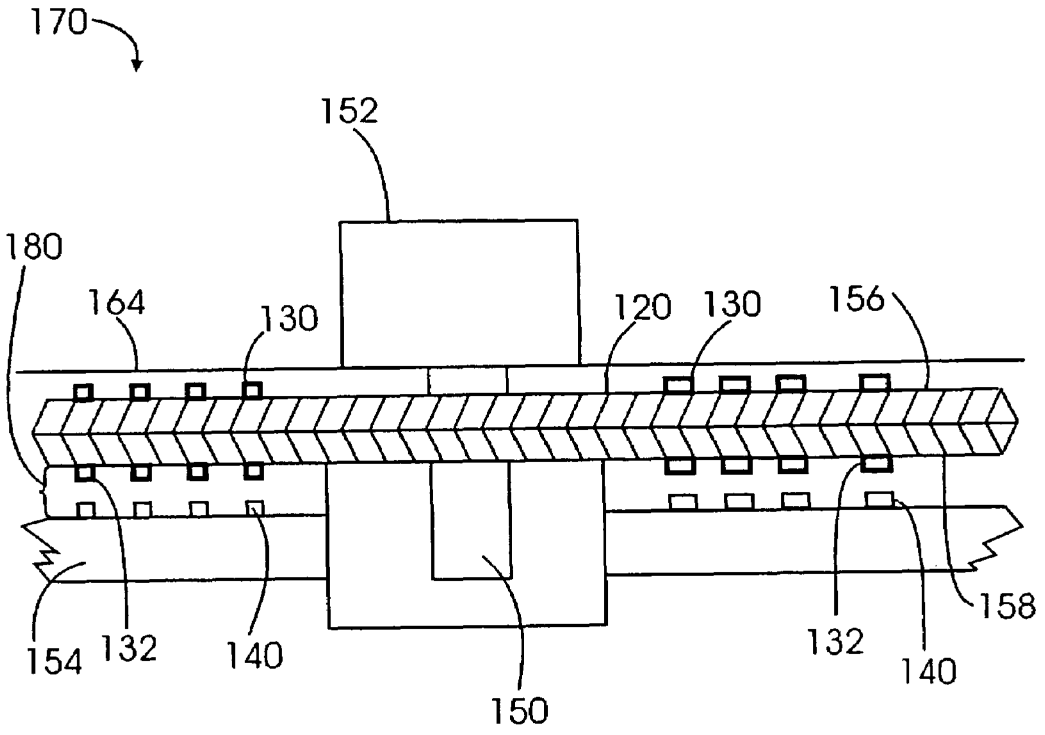
FIG. 7 is a side view of a rotary switch usable in a flight deck module, with parts broken away, according to still yet another present invention.

System for Rotary Code-Based Control:

FIG. 7 shows a system 170 for rotary code-based control (such as a systems control panel in a flight deck module). The system 170 may comprise a knob 152 connected to a shaft 150. A plurality of hall-effect sensors 140 may be affixed to a surface of a printed circuit board 154. The printed circuit board 154 may be connected to the shaft 150.

A carrier platter 120 with a plurality of magnets 130 affixed along the circumference of a first side 156 of the carrier platter 120 may be spaced a predetermined distance 180 from a surface of the carrier platter 120. The carrier platter 120 may be connected to the shaft 150. A plurality of magnets 132 may be affixed, in an arcuate orientation, along the circumference of a second side 158 of the carrier platter 120. The carrier platter 120 may have a plurality of magnets 130, 132 affixed along the circumference of both sides 156, 158 of the carrier platter 120. At least one of the hall-effect sensors 140 may be associated with each of the magnets 130, 132 for detecting when the sensor 140 is in close proximity to such associated magnet 130, 132.

The shaft 150 may be positioned so that it is intersecting with one or more of a front plate 164, the carrier platter 120, and the printed circuit board 154 for rotating the carrier platter 120.

In general, turning of the knob 152 moves the carrier platter 120 and adjusts the spatial relationship between the magnets 130, 132 and sensors 140. The outputs of the sensors 140 are functions of the distances between the magnets 130, 132 and the sensors 140, and therefore indicate positions of the knob 152.

Figure 8:
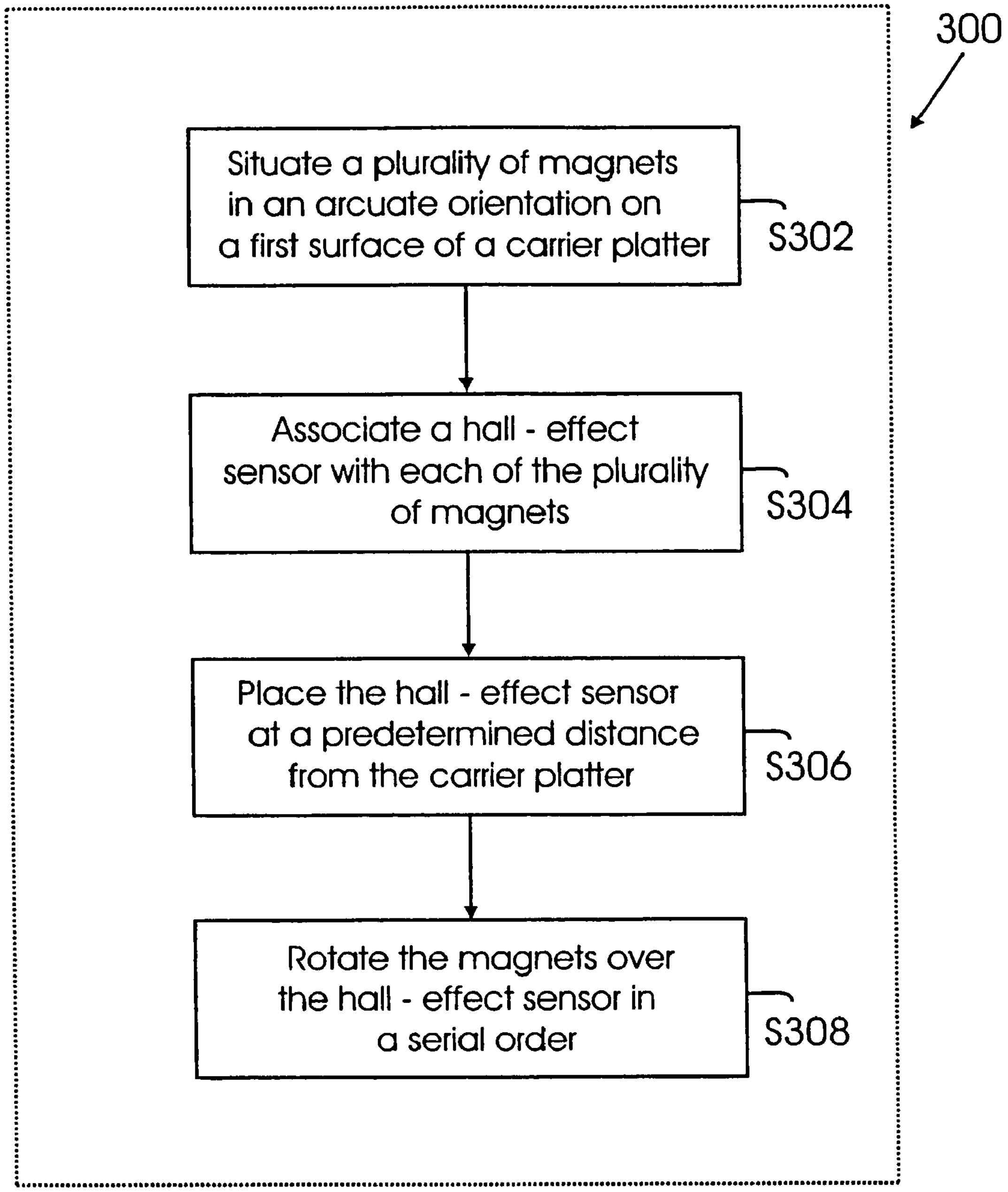
FIG. 8 is a flow chart of a method for rotary code-based control of control knob position signals, according to a still further embodiment of the present invention.

Method for Rotary Code-Based Control Signals:

FIG. 8 shows a flow chart of a method 300 for rotary code-based control of control knob position signals. The method 300 may comprise a step S302 of situating a plurality of magnets in an arcuate orientation on a first surface of a carrier platter. The method further comprises associating a hall-effect sensor with each of the plurality of magnets in step S304; and placing the hall-effect sensor at a predetermined distance from the carrier platter in step S306. The method may also comprise rotating the magnets over the hall-effect sensor in a serial order in step S308. The method 300 may be conducted wherein the plurality of magnets are affixed along the circumference of the first side of the carrier platter. Additionally, a plurality of magnets may be affixed onto a second side of the carrier platter. The printed circuit board may be spaced a predetermined distance from a surface of the carrier platter.

Figure 9:
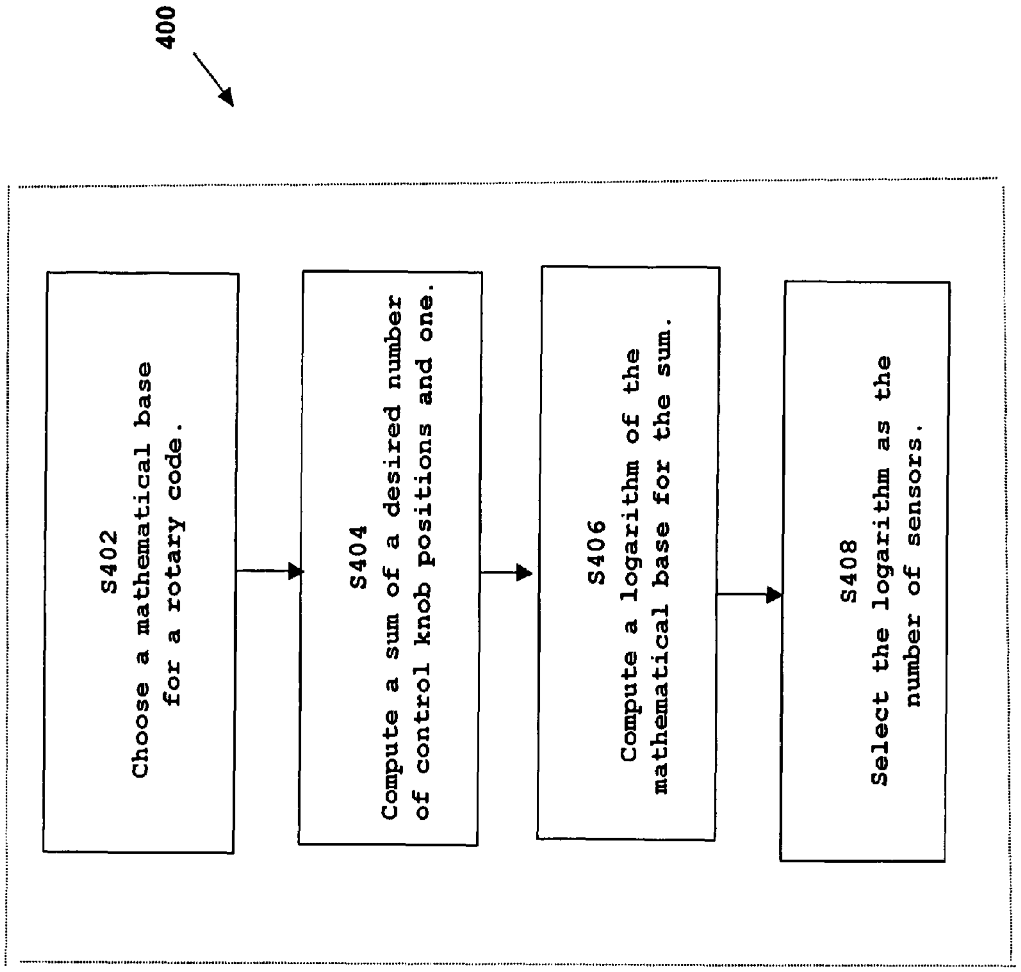
FIG. 9 is a flow chart of a method for selecting a number of sensors used for rotary code-based control of control knob position signals, according to a still further embodiment of the present invention.

Method for Selecting a Number of Sensors:

FIG. 9 shows a flow chart of a method 400 for selecting a number of sensors used for rotary code-based control of control knob position signals. The method 400 may comprise a step S402 of choosing a mathematical base for a rotary code. A step S404 may comprise computing a sum of a desired number of control knob positions and one, to include in-between position codes (such as 000).

The method may further comprise computing a logarithm of the mathematical base for the sum in step S406 and selecting the logarithm, rounded up to the nearest whole number as the number of sensors in step S408. The mathematical base may be the number two (binary), the number three (base 3), or any other number. For example, when using a base 3 coding scheme and desiring 26 control knob positions: $\log_3(26+1)=\log_3(27)=3$. In this case, the selected number of sensors would be three.

Figure 10:
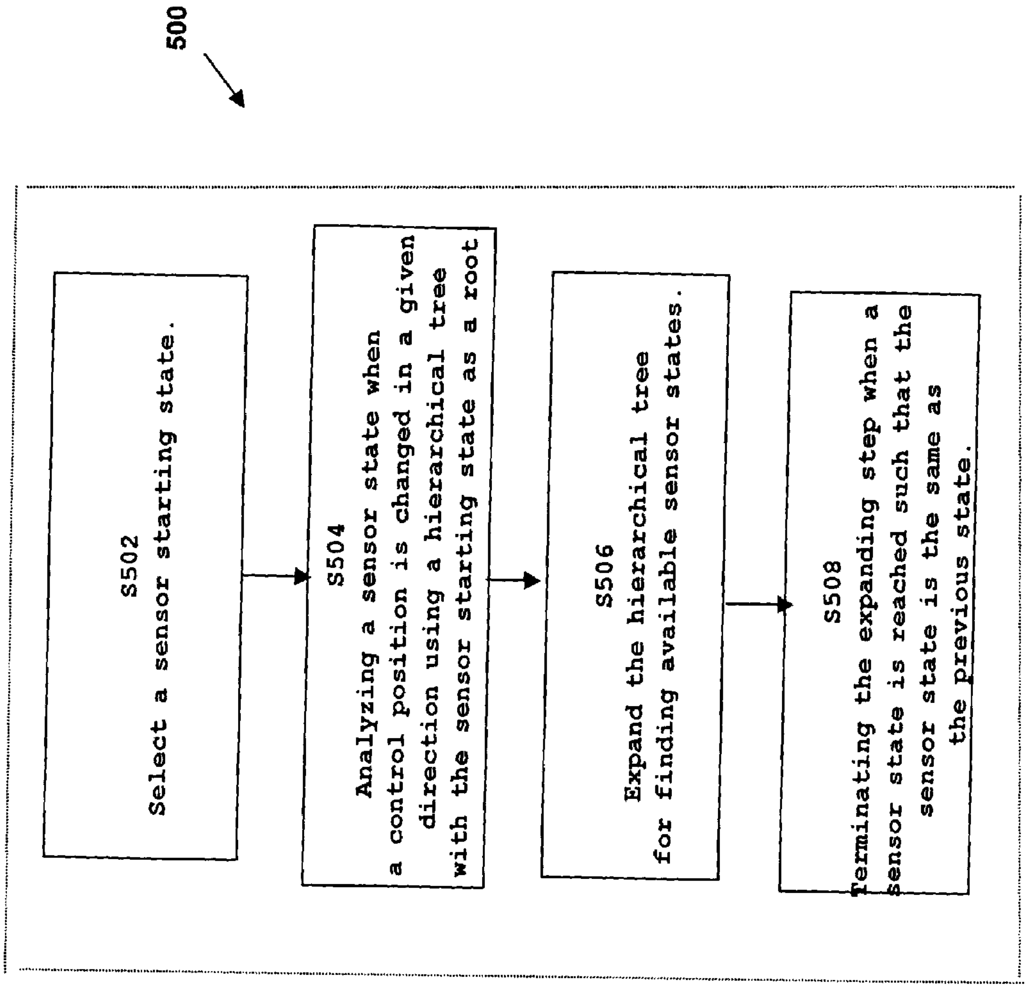
FIG. 10 is a flow chart of a method for generating available sensor states for a rotating code, for rotary code-based control using a sensor, according to a still further embodiment of the present invention.

Method for Generating Available Sensor States:

FIG. 10 shows a flow chart of a method 500 for generating available sensor states for a rotating code, for rotary code-based control using a sensor. The method 500 may comprise a step S502 of selecting a sensor starting state. A step S504 may comprise analyzing a sensor state when a control position is changed in a given direction using a hierarchical tree with the sensor starting state as a root.

The method may further comprise expanding the hierarchical tree for finding available sensor states in step S506. The method 500 may comprise a further step S508 of terminating the expanding step when a sensor state is reached such that the sensor state is the same as previous state in the sequence or the in-between state. The code sequence is not usable unless the previous state found is the same as the starting state. The number of digits in the sensor starting state may be equal to a number of sensors used for rotary code-based control.

Although the present invention has been described with reference to specific embodiments, these embodiments are illustrative only and not limiting. Many other applications and embodiments of the present invention will be apparent in light of this disclosure and the following claims.

The invention claimed is:

1. A flight deck module, comprising:

a knob connected to a shaft;

a plurality of sensors affixed to a surface of a printed circuit board in an arcuate orientation the printed circuit board connected to the shaft;

a carrier platter, the carrier platter connected to the shaft; and a plurality of sources affixed onto a first side of the carrier platter in an arcuate orientation, the plurality of sensors and the plurality of sources configured to be selectively movable relative to each other in an arcuate path and the plurality of sensors configured to detect one or more of the plurality of sources, wherein more than one subset of sources are configured to be sensed by a subset of plurality of sensors to provide a redundant code between at least two subsets of sources.

2. The flight deck module of claim 1, wherein the plurality of sources are affixed along the circumference of the first side of the carrier platter.

3. The flight deck module of claim 1, wherein at least one of the sources is a permanent magnet.

4. The flight deck module of claim 1, wherein at least one of the sensors is a halleffect sensor.

5. The flight deck module of claim 1, wherein the printed circuit board is spaced a predetermined distance from a surface of the carrier platter.

6. The flight deck module of claim 1, further comprising a plurality of sources affixed onto a second side of the carrier platter.

7. The flight deck module of claim 1, wherein the plurality of sensors are configured to detect one or more of the plurality of sources in a serial order.

8. The flight deck module of claim 1, wherein the sensors are analog sensors configured to detect at east three states.

9. The flight deck module of claim 8, wherein the sources are permanent magnets and the poles of the sources are oriented relative to the sensors to detect at least three states.

10. The flight deck module of claim 9, wherein the poles of the sources are oriented either substantially north-south or substantially south-north relative to the sensors.

11. The flight deck module of claim 1, wherein the subset of plurality of sensors are configured to detect one or more of the plurality of subset of sources in a serial order.

12. The flight deck module of claim 1, wherein the plurality of sensors and the plurality of sources are configured to form a rotary code-based control of control knob position signals, the rotary code having a mathematical base, and the number of sensors determined by the logarithm of the mathematical base for a sum derived by adding one to the desired number of control knob positions.

13. The flight deck module of claim 12, wherein the mathematical base is the number two.

14. The flight deck module of claim 12, wherein the mathematical base is the number three.

* * * * *